United States Patent
Lechner et al.

(10) Patent No.: US 11,787,431 B2
(45) Date of Patent: Oct. 17, 2023

(54) OVERRIDE OF ROUTE EVENTS IN THE AUTOMATIC LONGITUDINAL GUIDANCE MODE

(71) Applicant: Bayerische Motoren Werke Aktiengesellschaft, Munich (DE)

(72) Inventors: Andreas Lechner, Munich (DE); Miguel Loenne, Munich (DE); Sebastien Mathieu, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 366 days.

(21) Appl. No.: 17/055,952

(22) PCT Filed: May 14, 2019

(86) PCT No.: PCT/EP2019/062278
§ 371 (c)(1),
(2) Date: Nov. 16, 2020

(87) PCT Pub. No.: WO2019/219640
PCT Pub. Date: Nov. 21, 2019

(65) Prior Publication Data
US 2021/0237755 A1 Aug. 5, 2021

(30) Foreign Application Priority Data
May 17, 2018 (DE) .................. 10 2018 207 810.6

(51) Int. Cl.
*B60W 50/10* (2012.01)
*B60W 30/14* (2006.01)
(Continued)

(52) U.S. Cl.
CPC .......... *B60W 50/10* (2013.01); *B60W 30/143* (2013.01); *B60W 30/18145* (2013.01);
(Continued)

(58) Field of Classification Search
None
See application file for complete search history.

(56) References Cited

U.S. PATENT DOCUMENTS

| 10,274,962 B2 | 4/2019 | Sekijima | |
| 2001/0027368 A1* | 10/2001 | Minowa | B60K 31/042 |
| | | | 701/93 |

(Continued)

FOREIGN PATENT DOCUMENTS

| DE | 103 43 178 A1 | 4/2005 |
| DE | 10 2005 036 923 A1 | 2/2007 |

(Continued)

OTHER PUBLICATIONS

PCT/EP2019/062278, International Search Report dated Jul. 25, 2019 (Two (2) pages).
(Continued)

*Primary Examiner* — Maceeh Anwari
(74) *Attorney, Agent, or Firm* — Crowell & Moring LLP

(57) ABSTRACT

A method for overriding a driving mode in an automatic longitudinal guidance mode of a motor vehicle includes setting a longitudinal guidance mode in the motor vehicle, providing a target speed for a journey event in the longitudinal guidance mode, manually overriding the target speed when the journey event is driven through by the motor vehicle, and aborting of the longitudinal guidance mode if the target speed of the journey event cannot be achieved within a settable delay.

9 Claims, 1 Drawing Sheet

(51) Int. Cl.
  *B60W 30/18* (2012.01)
  *B60K 31/00* (2006.01)
(52) U.S. Cl.
  CPC ... *B60W 30/18154* (2013.01); *B60K 31/0066* (2013.01); *B60W 2520/10* (2013.01); *B60W 2540/10* (2013.01); *B60W 2552/05* (2020.02); *B60W 2552/30* (2020.02); *B60W 2555/60* (2020.02)

(56) References Cited

U.S. PATENT DOCUMENTS

| | | | | |
|---|---|---|---|---|
| 2018/0015920 | A1* | 1/2018 | Schuberth | B60W 30/143 |
| 2018/0319397 | A1* | 11/2018 | Ohta | B60W 10/04 |
| 2020/0017110 | A1* | 1/2020 | Herring | B60W 10/18 |

FOREIGN PATENT DOCUMENTS

| | | |
|---|---|---|
| DE | 10 2005 036 924 A1 | 2/2007 |
| DE | 10 2014 221 835 A1 | 4/2016 |
| DE | 10 2015 000 539 A1 | 7/2016 |
| DE | 10 2015 213 181 B3 | 1/2017 |
| DE | 10 2017 100 323 A1 | 8/2017 |

OTHER PUBLICATIONS

German Search Report issued in German application No. 10 2018 207 810.6 dated Dec. 17, 2018, with Statement of Relevancy (Seven (7) pages).

German-language German Office Action issued in German application No. 10 2018 207 810.6 dated Sep. 14, 2020, (Five (5) pages).

\* cited by examiner

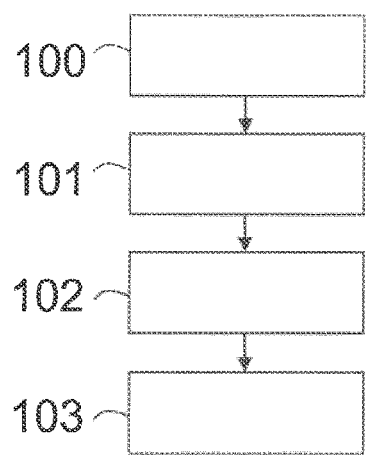

OVERRIDE OF ROUTE EVENTS IN THE AUTOMATIC LONGITUDINAL GUIDANCE MODE

BACKGROUND AND SUMMARY OF THE INVENTION

The invention relates to a method for overriding route events in the automatic longitudinal guidance mode. According to the invention it is possible that the driver has a greater influence on an existing longitudinal guidance mode and nevertheless continues to receive assistance or else carries out control manually. In addition, the present invention relates to a correspondingly configured system arrangement. Furthermore, a computer program product with control instructions is proposed, which instructions implement the method or operate the proposed system arrangement.

DE 10 2005 036 924 A1 relates to a driver assistance system for a motor vehicle which has a controller for controlling the acceleration of the motor vehicle according to a setpoint acceleration.

DE 10 343 178 A1 presents a driver assistance system for motor vehicles, having a sensor device for sensing the traffic surroundings and a controller for controlling the acceleration of the vehicle according to a predefined longitudinal guidance strategy, characterized by a strategy module for variably determining the longitudinal guidance strategy to be applied. It is possible to monitor the accelerator pedal using the accelerator pedal monitor even if, given active ACC control, the driver overrides this control temporarily by actuating the accelerator pedal. If the ACC function is active, the actuation of the brake pedal results in automatic deactivation of the function, so that the activation of the brake pedal by the driver can then also be monitored again. Consequently, this prior art deactivates the longitudinal guidance strategy definitively.

DE 10 2005 036 923 A1 presents an operator control device for a driver assistance system of a motor vehicle having a controller for controlling the acceleration of the motor vehicle according to a setpoint acceleration, characterized by an acceleration operator control element for inputting an additional acceleration which can be predefined by the driver of the motor vehicle and acts on the controller.

The adaptive cruise control or ACC system makes it possible according to the prior art that the driver sets the desired speed with an operator control element, for example push button keys, on the steering wheel, and the system then controls the speed as appropriate in accordance with the time interval from the vehicle traveling ahead. The driver can change the desired speed or deactivate the system with these operator control elements. Furthermore, it is generally possible for the driver to override the system with the accelerator pedal (for immediate higher speed), as a result of which the control is temporarily suspended in order to deactivate the system with the brake pedal.

The prior art has the disadvantage that definitive aborting by the driver always occurs when the accelerator pedal is activated after control has started. There is no resumption of the control after the pedal is released again. Activating the brake causes a longitudinal guidance strategy to be aborted. Known methods do not at present provide the possibility of influencing the reaction time of the system cooperatively.

An object of the present invention is to propose an improved, in particular adaptive, method for overriding route events in the automatic longitudinal guidance mode. In addition, an object of the present invention is to provide a correspondingly configured system arrangement and to propose a computer program product with control instructions which implement the method or at least partially operate the proposed system arrangement.

Accordingly, a method for overriding a driving mode in the automatic longitudinal guidance mode of a motor vehicle is proposed, comprising setting a longitudinal guidance mode in the motor vehicle; providing in each case a target speed for individual journey events in the longitudinal guidance mode; manually overriding the target speed when the journey event is driven through, wherein aborting of the longitudinal guidance mode occurs if the target speed of the journey event cannot be achieved within a settable delay.

The present invention is directed at a method for overriding a driving mode, wherein the driving mode relates to a longitudinal guidance. A longitudinal guidance can take place quite generally by means of a cruise controller which maintains a predefined speed of a motor vehicle. In this context, the invention overcomes the disadvantage that switching occurs from the automatic longitudinal guidance mode into a manual mode as soon as the driver executes a driving maneuver. Such a driving maneuver may be a braking process or an acceleration process. According to conventional methods, the automatic longitudinal guidance mode is then typically always switched off and the driver has to assume manual control again completely.

Occasionally it is also possible for the selected driving mode to be continued again as soon as the driver has made a manual input. According to conventional methods, there is therefore the disadvantage that when the selected driving mode is overridden the corresponding control switches back again into the selected driving mode again after the manual input without taking into account at all any further parameters.

Therefore, the present invention provides a superior method, since switching back into the selected driving mode does not occur in all cases but instead it is checked whether the desired longitudinal guidance mode can be continued again after a settable delay. The disadvantage is therefore overcome that when a driving mode is severely overridden a very long time period passes until the target speed is reached again. This is disadvantageous insofar as a duration of, for example, over 10 seconds is required for the target speed to be able to be reached again when it is severely exceeded. Since this is a safety-critical aspect it is advantageous to check whether a given time period is exceeded and then to return control to the driver again if this time period is exceeded.

The longitudinal guidance mode can take place in such a way that a target speed is respectively predefined for individual journey events. It is possible, for example, for a journey event to be in the form of a bend into which the motor vehicle drives. In this context it can be dynamically calculated how high the target speed in the respective bend is to be. An influencing parameter is the bend radius and/or a lateral acceleration. If it is, for example, a sizeable bend, a correspondingly higher value can be selected for the target speed. In the case of a tight bend, a certain lateral acceleration would be exceeded at a high speed, and on the one hand the driving experience would suffer and in addition safety would be adversely affected. In this respect, it is advantageous that according to the invention the target speed can be calculated in an automated fashion and at the same time information of an optical sensor and/or from navigation data can be processed.

Therefore, the proposed method can determine individual points at which entry into a bend and exiting into a bend takes place. In addition, vertices can be calculated. The target speed can then be stored in a data memory on the basis of the curve under discussion. In addition, it is possible already to have a data memory available which keeps a target speed available for all the measured parameters.

The target speed is always set automatically by the cruise controller and the current speed is always adapted in the direction of the target speed. However, it is generally the case that the driver wishes to have a higher speed, since this corresponds to his driving experience or he wishes, for example, to overtake. Individual critical driving situations also require acceleration beyond the target speed. This manual acceleration within a longitudinal guidance mode is referred to as overriding since the driver activates the accelerator pedal despite an automatic longitudinal guidance mode. Therefore, the vehicle correspondingly reacts and increases the speed, under certain circumstances even beyond the target speed. The prior art presents in this context the disadvantage that either the automatic longitudinal guidance is aborted or else switching back occurs into the longitudinal guidance mode without taking into account further parameters. According to the invention, after overriding by activation of the accelerator pedal, definitive aborting takes place provided that the target speed of the event can no longer be achieved with an applicatively settable delay.

It is therefore advantageously possible to set a delay of 5-10 seconds, and if the target speed cannot be achieved in accordance with the speed at which the vehicle is currently driving, the automatic longitudinal guidance is aborted and the driver has to assume manual control again. This provides the driver with the possibility of being able to influence the reaction time of the system cooperatively. Full control is therefore returned to him directly, and the longitudinal guidance mode is discontinued.

If, on the other hand, it is detected that the target speed can be achieved within the given time period, the process is continued and the automatic longitudinal guidance mode is maintained.

The settable delay can be stored in such a way that a manufacturer determines this empirically and stores it in a data memory. Furthermore, the delay can be specified on the basis of a manual input of the driver. This input can occur within the scope of the setting of a driving mode in such a way that the manufacturer makes available different driving modes and the driver then selects a mode. If, for example, a sporty mode is set, very hard braking may occur and the target speed is typically reached within the set delay. If, however, a comfortable driving mode is set, abrupt braking may not occur and the longitudinal guidance mode is subsequently aborted. If the longitudinal guidance mode is aborted, an optical, acoustic and/or haptic signal can be output to the driver. A haptic signal can be passed on, inter alia, via a steering wheel which vibrates. A person skilled in the art is familiar with corresponding apparatuses and procedures with respect to optical and acoustic warning signals.

After overriding by activation of an accelerator pedal occurs, the aborting of the control is to be definitive provided that the target speed of the event can no longer be achieved with an applicatively settable delay. The driver therefore has the possibility of cooperatively influencing the reaction time of the system. Applicatively means, according to one aspect of the present invention, that in the development there is the possibility of adjusting the described factors. They are then permanently set in the control device.

While a system is overridden, an upcoming control process is also indicated, which control process can be started by the driver by releasing the accelerator pedal. A control process which has already started can therefore be briefly overridden and starts again with a longer delay after release occurs. Therefore, there is again a changeover into the mode which was present before the overriding.

According to one aspect of the present invention, the journey event is in the form of a bend, a roundabout, a turning, an exit, an entry slip road, a set of traffic lights and/or a speed specification. This has the advantage that the proposed method can be applied to a multiplicity of traffic situations and a conventional cruise controller can be expanded according to the invention. Thus, a separate target speed can be provided for all the journey events and it is therefore possible to react in a situation-specific fashion. In addition it is possible for the driver to specify individual journey events and at the same time indicate parameters for the reaction of the proposed method.

According to a further aspect of the present invention, in the longitudinal guidance mode a target speed is calculated dynamically for each journey event. This has the advantage that dynamic calculation can be carried out in such a way that during the running time, that is to say during the journey, a target speed can be calculated on the basis of currently measured parameters. It is therefore possible to read out navigation data or read out an optical sensor and then analyze the journey event and determine on the basis thereof what a suitable target speed is. The current speed can therefore be measured and a target speed can be determined, which is then adapted in accordance with journey events. Journey events such as, for example, bends have different parameters which can be analyzed and the target speed can then be advantageously set. In the case of bends or a roundabout, such a parameter is the radius, and in addition a maximum lateral acceleration can be set. The current state of the road can also be taken into account and further parameters, such as for example a negative gradient, can be analyzed. If information is present about a traffic volume, the target speed can be correspondingly limited. In addition it is possible to actually select the settable delay in such a way that there can be a dynamic reaction to the corresponding journey event.

According to a further aspect of the present invention, the manual overriding of the target speed results in acceleration beyond the target speed, in accordance with variation of a pedal position. This has the advantage that the driver is provided with all the possible ways of reacting to specific situations and of carrying out an overtaking process, for example by fully depressing the accelerator pedal, without in the process aborting the automatic longitudinal guidance. However, if after the overriding the target speed is not expected to be reached within a settable delay, the longitudinal guidance can be aborted and the driver can autonomously resolve a corresponding hazard situation. Consequently, the driver has full control over the vehicle and can intervene himself if the delay is expected to be exceeded, or otherwise he can simply accept the delay which is set and therefore remain in longitudinal guidance mode in an automated fashion.

According to a further aspect of the present invention, the manual overriding of the target speed results in acceleration beyond the envisaged acceleration. This has the advantage that the acceleration can also be freely selected and therefore an avoidance maneuver or an overtaking maneuver can actually also take place without the driver being tied to the target speed here. The envisaged acceleration is that acceleration which is set by the cruise controller according to the target speed provided. Therefore, it is also possible to accelerate beyond a preset acceleration without the method according to the invention aborting.

According to a further aspect of the present invention, the settable delay is set applicatively. This has the advantage that the settable delay can be stored by the manufacturer in a vehicle memory and is subsequently also fixed. Therefore, corresponding values are stored for all the journey events, and the manufacturer is able to determine these values empirically on the basis of a multiplicity of test cases. Therefore, the suitable set of parameters is provided for each type of vehicle. According to one aspect of the present invention, applicatively means that during development there is the possibility of adjusting the described factors. They are then permanently set in the control device.

According to a further aspect of the present invention, the settable delay is set in accordance with a driving mode. This has the advantage that the driving mode can be set from sporty to comfortable, wherein in the case of a sporty driving mode harder braking can take place and therefore the delay can be shorter. In the case of a comfortable mode, slower braking takes place and this also requires a longer delay. Consequently, the driver is provided with the possibility of having an individual driving experience, and the proposed method therefore adapts itself to the selected driving mode.

According to a further aspect of the present invention, checking is provided as to whether the target speed of the journey event can be achieved within the settable delay in accordance with the current velocity. This has the advantage that a predictive step occurs, which can indicate whether the target speed of the driving event can be achieved within the settable delay. To do this, the method employs existing sensors or the on board system and compares the current velocity with the target speed. Since generally parameters such as the possible braking performance are known to the method, conclusions can be drawn as to whether the target speed can be achieved within the settable delay during the present journey.

The object is also achieved by a system arrangement for overriding a driving mode in the automatic longitudinal guidance mode of a motor vehicle, comprising an interface unit configured to set a longitudinal guidance mode in the motor vehicle; a data memory configured to provide in each case a target speed for individual journey events in the longitudinal guidance mode; a cruise control unit configured to manually override the target speed when the journey event is driven through, wherein aborting of the longitudinal guidance mode occurs if the target speed of the journey event cannot be achieved within a settable delay.

The object is also achieved by means of a computer program product with control instructions which execute the method and operate the proposed arrangement when they are executed on a computer.

According to the invention it is particularly advantageous that the method can be used to operate the proposed apparatuses and units and/or the system arrangement. In addition, the proposed apparatuses and devices are suitable for executing the method according to the invention. Therefore, the apparatus respectively implements structural features which are suitable for executing the corresponding method. The structural features can, however, also be configured as method steps. The proposed method also provides steps for implementing the function of the structural features.

Further advantages, features and details of the invention can be found in the following description in which aspects of the invention are described in detail with reference to the drawings. In this context, the features which are mentioned in the claims and in the description can each be essential to the invention individually or in any desired combination. Likewise, the features which are mentioned above and those which are specified further herein can each be used independently or jointly in any desired combinations. The embodiments which are shown and described are not to be considered to be conclusive but rather have an exemplary character for explaining the invention. The detailed description serves to inform a person skilled in the art, and therefore in the description, known circuits, structures and methods are not shown or explained in detail, in order to facilitate comprehension of the present description.

BRIEF DESCRIPTION OF THE DRAWINGS

FIG. 1 shows a schematic flow diagram of a method for overriding a driving mode in the automatic longitudinal guidance mode of a motor vehicle according to one aspect of the present invention.

DETAILED DESCRIPTION OF THE DRAWINGS

FIG. 1 shows a schematic flow diagram of a method for overriding a driving mode in the automatic longitudinal guidance mode of a motor vehicle, comprising setting 100 a longitudinal guidance mode in the motor vehicle; providing 101 in each case a target speed for individual journey events in the longitudinal guidance mode; manually overriding 102 the target speed when the journey event is driven through, wherein aborting 103 of the longitudinal guidance mode occurs if the target speed of the journey event cannot be achieved within a settable delay.

The maximum desired or safe lateral acceleration can also be taken into account, which acceleration indicates, in accordance with a specific radius of the bend, how quickly the bend can be travelled through. In the case of a sporty driving style, a higher lateral acceleration is tolerated than in the case of a comfortable mode. Furthermore, a geometric method, which analyses the bend with respect to its inclination, can be applied. In addition, it is possible to read out navigation data and then determine which specific route profile the vehicle is travelling through.

A person skilled in the art knows here that the steps may have further sub-steps and, in particular, that the method steps can each be executed iteratively and/or in another sequence.

A data memory or a computer-readable medium with a computer program product having control instructions which implement the proposed method and operate the proposed system arrangement when they are executed on a computer is not shown here.

What is claimed is:

1. A method for overriding a driving mode in an automatic longitudinal guidance mode of a motor vehicle, comprising the steps of:
   setting the automatic longitudinal guidance mode in the motor vehicle, wherein a predefined speed for a journey event is maintained in the automatic longitudinal guidance mode;
   temporarily manually overriding the automatic longitudinal guidance mode by manually overriding the predefined speed when the journey event is driven through by the motor vehicle;
   after the temporarily manually overriding of the automatic longitudinal guidance mode, checking whether the automatic longitudinal guidance mode can be continued again by checking whether the predefined speed for the journey event can be achieved within a settable delay in accordance with a current velocity of the motor vehicle;

aborting of the automatic longitudinal guidance mode when the predefined speed of the journey event cannot be achieved within the settable delay and setting a manual driving mode wherein a driver has control of the motor vehicle after the aborting; and continuing again the automatic longitudinal guidance mode when the predefined speed for the journey event can be achieved within the settable delay.

2. The method according to claim 1, wherein the journey event is a bend, a roundabout, a turning, an exit, an entry slip road, a set of traffic lights or a speed specification.

3. The method according to claim 1, wherein the predefined speed is calculated dynamically for the journey event.

4. The method according to claim 1, wherein the manually overriding of the predefined speed results in acceleration of the motor vehicle beyond the predefined speed in accordance with a variation of a pedal position.

5. The method according to claim 1, wherein the manually overriding of the predefined speed results in acceleration of the motor vehicle beyond an envisaged acceleration.

6. The method according to claim 1, wherein the settable delay is set applicatively.

7. The method according to claim 1, wherein the settable delay is set in accordance with the driving mode.

8. A system arrangement for overriding a driving mode in an automatic longitudinal guidance mode of a motor vehicle, wherein the system arrangement is configured to perform the method according to claim 1.

9. A non-transitory computer program product comprising control instructions which execute the method comprising the steps of:

setting the automatic longitudinal guidance mode in the motor vehicle, wherein a predefined speed for a journey event is maintained in the automatic longitudinal guidance mode; temporarily manually overriding the automatic longitudinal guidance mode by manually overriding the predefined speed when the journey event is driven through by the motor vehicle;

after the temporarily manually overriding of the automatic longitudinal guidance mode, checking whether the automatic longitudinal guidance mode can be continued again by checking whether the predefined speed for the journey event can be achieved within a settable delay in accordance with a current velocity of the motor vehicle;

aborting of the automatic longitudinal guidance mode when the predefined speed of the journey event cannot be achieved within the settable delay and setting a manual driving mode wherein a driver has control of the motor vehicle after the aborting; and continuing again the automatic longitudinal guidance mode when the predefined speed for the journey event can be achieved within the settable delay.

* * * * *